Patented Jan. 3, 1950

2,493,710

UNITED STATES PATENT OFFICE 2,493,710

CARBAMIC ACID ESTERS

John A. Aeschlimann, Montclair, N. J., and Arthur Stempel, Brooklyn, N. Y., assignors to Hoffmann-La Roche Inc., Nutley, N. J., a corporation of New Jersey No Drawing. Application March 21, 1947, Serial No. 736,429

13 Claims. (Cl. 260—479)

This invention relates to disubstituted carbamic acid esters of phenolic primary alkylamines and secondary alkylamines, and to processes for their production. The new compounds can be represented by the general formula:

(I) R'R''NCOO—A—X

In the above formula, R' and R'' represent alkyl, aryl, substituted aryl, aralkyl radicals or, taken together with N, form a heterocyclic nucleus as, for instance, of piperidine, morpholine, piperazine, tetrahydroisoquinoline, and the like. A represents an aryl nucleus, such as a benzene or a naphthalene nucleus, and X represents a primary aminoalkyl or secondary aminoalkyl radical as, for example, a monoalkylaminoalkyl radical. As examples of such radicals there are mentioned the following:

$NH_2CH_2$—, $NH_2CH_2CH_2$—, alkyl—NH—$CH_2$—, as for example, $CH_3NH$—$CH(CH_3)$— and the like.

The new compounds are strong bases and form salts with acids which are soluble in water, forming stable, approximately neutral solutions. Some of the bases are soluble in water as such or in the form of their lower acyl-amides, in which case X in the above formula stands also for an acyl aminoalkyl radical, as for example, $CH_3CONHCH_2$— and the like. A surprising property of the salts is that they are in many cases almost as active when given orally as on injection. On the other hand, the disubstituted carbamic acid esters of phenols containing a tertiary amine group which has been quaternized, such as are described in U. S. Patents Nos. 1,905,990 and 2,208,485, granted to J. A. Aeschlimann, are far more active on injection than by mouth. For this reason our new compounds are especially suitable for oral medication. Furthermore, contrary to the lower homologs, such as the diphenyl carbamic esters of ortho-amino phenol, which do not form neutral soluble salts, as see Herzog Ber. 40, 1833, our new compounds form neutral salts with acids. In addition, the new compounds are stable, differing from the monosubstituted carbamic esters of tertiary amines prepared by Stedman, J. Pharm. 41, 259 which are unstable in aqueous solution, liberating methyl isocyanate.

Another characteristic of our new carbamic acid esters resides in their pronounced inhibitive action on cholinesterase, and the different esterases occurring in brain, red cells or serum are inhibited to different degrees. The more specific action on enzymes of the compounds constituting our invention causes their pharmacological action to differ from that of physostigmine or the disubstituted carbamic acid esters of phenolic tertiary amines described in the patents above referred to which are the most commonly employed esterase-inhibitors.

The new disubstituted carbamic acid esters of phenolic primary and secondary alkylamines can be readily converted to the salt form, for example, the hydrochloride or sulfate, by treatment with hydrogen chloride, sulfuric acid, methane- or toluene-sulfonic acids, and similar agents. It is intended to include under the formula given above, not only the base, but also such salts with acids.

Unlike the disubstituted carbamic acid esters of phenolic tertiary amines, the new disubstituted carbamic acid esters of phenolic primary alkylamines and secondary alkylamines cannot be prepared like the compound described in the above mentioned patents, by acting on a phenolic primary amine or phenolic secondary amine with a disubstituted carbamyl halide. When such a procedure is attempted on the phenolic primary and secondary amines, we have found that the disubstituted carbamyl chloride reacts preferentially with the amino group to form a substituted urea instead of with the hydroxy group to esterify it to form a carbamic acid ester.

We have discovered, however, that the disubstituted carbamic acid esters of phenolic primary alkylamines and secondary alkylamines constituting our invention can be prepared by first introducing the ester grouping into a phenolic compound containing a radical convertible into an amino group. For example, we have found that the amino group of p-hydroxy-phenyl-ethylamine (tyramine) can be converted to its benzyl urethane which can then be reacted with a disubstituted carbamyl chloride to form a carbamic ester. The latter compound can then be hydrogenated to remove the carbobenzoxy group by hydrogenolysis to form the desired disubstituted carbamic acid ester of the phenolic primary amine. The following schematic equation will serve to illustrate this procedure:

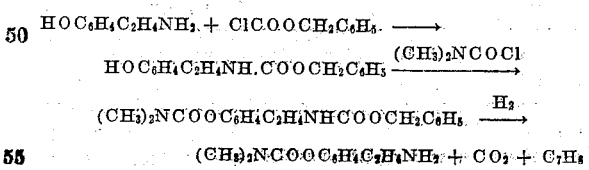

In an alternative procedure we have found that the cyano group of a disubstituted carbamic acid ester of a phenolic nitrile can be hydrogenated to an aminomethyl group according to the following schematic equation:

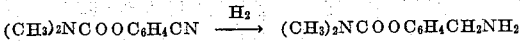

$$(CH_3)_2NCOOC_6H_4CN \xrightarrow{H_2} (CH_3)_2NCOOC_6H_4CH_2NH_2$$

In another procedure a disubstituted carbamic acid ester of a phenolic alkyldibenzylamine or of a phenolic alkylbenzylalkylamine can be hydrogenated to remove the benzyl group, this procedure being illustrated by the following schematic equations:

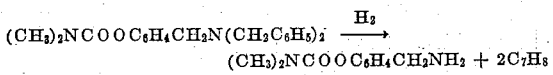

$$(CH_3)_2NCOOC_6H_4CH_2N(CH_2C_6H_5)_2 \xrightarrow{H_2}$$
$$(CH_3)_2NCOOC_6H_4CH_2NH_2 + 2C_7H_8$$

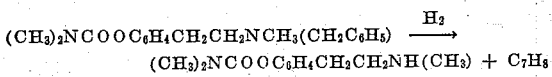

$$(CH_3)_2NCOOC_6H_4CH_2CH_2NCH_3(CH_2C_6H_5) \xrightarrow{H_2}$$
$$(CH_3)_2NCOOC_6H_4CH_2CH_2NH(CH_3) + C_7H_8$$

In still another procedure the disubstituted carbamic acid esters of phenolic primary alkylamines can be obtained by reacting a disubstituted carbamic acid ester of a phenolic aldehyde with an alkyl nitro compound and reducing the resulting compound. This procedure is illustrated by the following schematic equation:

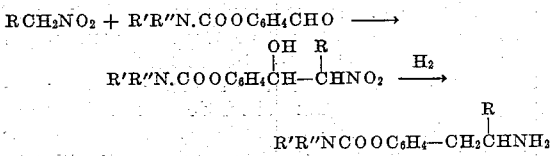

$$RCH_2NO_2 + R'R''N.COOC_6H_4CHO \longrightarrow$$

$$R'R''N.COOC_6H_4\overset{OH}{\underset{|}{C}}H-\overset{R}{\underset{|}{C}}HNO_2 \xrightarrow{H_2}$$

$$R'R''NCOOC_6H_4-CH_2\overset{R}{\underset{|}{C}}HNH_2$$

In a similar manner compounds containing an oximino-radical, as where in the above equation the CHNO$_2$ group is replaced by CH:NOH, can be converted into the compounds of Formula I.

The primary amines obtained by the above-mentioned procedures can be monoalkylated as, for example, by alkyl halides or sulfates or tolu-sulfonates or by hydrogenation with aldehydes, or methylated by formaldehyde and formic acid to the corresponding secondary amines.

In another procedure the primary and secondary amines may also be prepared from disubstituted carbamic acid esters of phenolic aldehydes or ketones by hydrogenating such aldehydes or ketones in the presence of a primary amine. The following schematic equations will serve to illustrate this reaction:

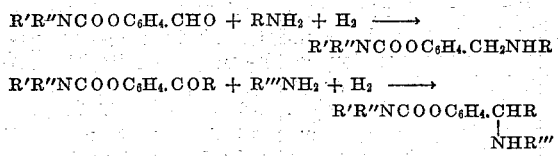

$$R'R''NCOOC_6H_4.CHO + RNH_2 + H_2 \longrightarrow$$
$$R'R''NCOOC_6H_4.CH_2NHR$$

$$R'R''NCOOC_6H_4.COR + R'''NH_2 + H_2 \longrightarrow$$
$$R'R''NCOOC_6H_4.\underset{\underset{NHR'''}{|}}{C}HR$$

In the above equations R' and R'' have the same significance as indicated therefor in Formula I; R and R''' stand for alkyl radicals such as methyl, ethyl, propyl and the like.

In still another procedure which does not involve hydrogenation, the new compounds can also be prepared from disubstituted carbamic acid esters of phenolic alkyl halides by reacting for example, a disubstituted carbamic acid ester of a phenolic alkyl bromide with an excess of a primary amine or ammonia under mild conditions which do not hydrolyze the disubstituted carbamyl ester group.

The following examples will serve to illustrate our invention, but it is to be understood that they are given by way of illustration and not limitation.

EXAMPLE 1

*Dimethyl carbamic acid ester of ortho-hydroxybenzylamine*

To 12.1 grams of salicylamine dissolved in 50 cc. of 2 N sodium hydroxide were added simultaneously, dropwise, 17 grams of carbobenzoxy chloride and 50 cc. of 2.5 N sodium hydroxide. The solid material obtained was filtered off and the aqueous layer was extracted with ether. The sodium hydroxide layer was acidified with HCl and extracted with ether. The ether was evaporated, leaving a crystalline residue of 23 grams, which was crystallized from ligroin. The compound thus obtained was N-carbobenzoxy salicylamine, M. P. 71–73° C. This was dissolved in 50 cc. of anhydrous pyridine and 6.7 grams of dimethyl carbamyl chloride added and heated on a steam bath for six hours, cooled and made alkaline with 10 per cent sodium hydroxide, extracted with ether and the ether layer extracted with 2 N HCl to remove pyridine. After drying and evaporating the ether, the residue crystallized. It was recrystallized from dilute alcohol, yielding the dimethyl carbamyl ester of N-carbobenzoxy salicylamine, M. P. 72–73° C. Ten grams of this dimethyl carbamyl ester were dissolved in 100 cc. of methanol containing 10 cc. of 5 per cent palladium chloride, and hydrogenated at 50 lbs. pressure. The mixture was acidified with HCl and extracted with ether. The aqueous layer was concentrated to dryness in vacuo and the residue crystallized from ethyl acetate. The compound thus obtained was the hydrochloride of the dimethyl carbamyl ester of ortho-hydroxy benzylamine. It has a M. P. of 118–119° C. and is soluble in water.

In a similar manner, by employing α-methyl-piperidine-N-carbamyl-chloride, there is obtained the pipecolyl-N-carboxylic acid ester of ortho-hydroxy benzylamine hydrochloride.

By proceeding in the same manner as in Example 1, but employing the diphenyl carbamic acid chloride, there is obtained the diphenyl carbamic acid ester of ortho-hydroxy benzylamine hydrochloride. Similarly, by utilizing methyl phenyl carbamic acid chloride in place of the dimethyl carbamic acid chloride in Example 1, there is obtained the methyl phenyl carbamic acid ester of ortho-hydroxy benzylamine hydrochloride.

EXAMPLE 2

*N-acetyl-o-dimethylcarbamoxy-benzylamine*

10 grams of o-hydroxy benzonitrile in 50 cc. of anhydrous pyridine and 10 cc. of dimethyl carbamyl chloride were heated for four hours, cooled and diluted with water; made alkaline with 10 per cent sodium hydroxide, and extracted with ether. On removal of ether and pyridine in vacuo, there was obtained in crystalline form the dimethyl carbamyl ester of o-hydroxy-benzonitrile which was purified by distillation at 85° C. and $\tfrac{1}{10}$ mm. pressure. Ten grams of this dimethyl carbamyl ester were reduced with hydrogen in 50 cc. of acetic anhydride employing 500 mg. of platinum oxide catalyst and the mixture poured onto ice and made slightly alkaline with sodium hydroxide. The product crystallized from alkaline solution and was recrystallized from a mixture of benzene and ligroin. The N-acetyl-o-dimethyl carbamoxy-benzylamine thus obtained has a M. P. of 87–88° C., is very soluble in water and has a pronounced inhibitive action on cholinesterase. It can also be prepared by acetylation of the dimethyl carbamyl ester of o-hydroxy benzylamine obtained in Example 1.

EXAMPLE 3

*Dimethyl carbamic acid ester of p-hydroxyphenylethylamine*

To 11.3 grams of p-hydroxyphenylethylamine (tyramine) dissolved in 50 cc. of 2 N sodium hydroxide were added simultaneously dropwise, 26 grams of carbobenzoxy chloride and 50 cc. of 2.5 N sodium hydroxide. The mixture was extracted with ether and the sodium hydroxide solution then acidified with hydrochloric acid. The N-carbobenzoxy tyramine which formed was then extracted with ether and crystallized from dilute alcohol in a yield of 8.8 grams. It had a M. P. of 98–99° C. This compound was dissolved in 50 cc. of anhydrous pyridine containing 3.5 cc. of dimethyl carbamyl chloride and heated for six hours on a steam bath, cooled and made alkaline with 10 per cent sodium hydroxide, extracted with ether and the pyridine removed with dilute hydrochloric acid. After drying and evaporation of the ether, the residue crystallized. It was recrystallized from dilute alcohol. The dimethyl carbamyl ester of N-carbobenzoxy tyramine thus obtained had a M. P. of 105–106° C. 6.6 grams of this compound were then hydrogenated with palladium on charcoal as a catalyst in methanol solution. After removal of the methanol by distillation, the residue was acidified with HCl and evaporated to dryness in vacuo. The dimethyl carbamic acid ester of p-hydroxyphenylethylamine hydrochloride which formed was then recrystallized from a mixture of ethanol and ethyl acetate; M. P. 257–259° C. with decomposition.

EXAMPLE 4

*Dimethyl carbamic ester of N-[(2-hydroxy-5-phenyl)-benzyl]-methylamine hydrochloride*

N-[(2 - hydroxy-5-phenyl)-benzyl]-N-methylbenzylamine hydrochloride was made by adding 45 cc. of a 35% formaldehyde solution dropwise while stirring to a solution of 85 grams of p-hydroxy diphenyl and 60.5 grams of N-methylbenzylamine in 500 cc. of 75% ethanol and refluxing the mixture for two hours. After about one hour the mixture became turbid and an oily layer separated. On standing overnight, the supernatant liquid was readily decanted from the oily layer and the oil was then taken up in ether and extracted with 3 N hydrochloric acid. The hydrochloride of N-[(2-hydroxy-5-phenyl)-benzyl]-N-methylbenzylamine crystallized. It was recrystallized from ethanol and had a M. P. of 191–192° C.

The free base, liberated with sodium hydroxide from 82.6 grams of the hydrochloride, is extracted with 100 cc. of benzene. By heating the dried benzene extract together with 75 cc. of pyridine and 38 grams of dimethyl carbamyl chloride on a steam bath for three hours, the free base is converted into the dimethyl carbamic ester. The solution was then poured into water and made alkaline with sodium hydroxide. The aqueous layer was extracted with ether. After washing with water, the ether layer was dried over sodium sulfate and the solvent removed by distillation. The residue was crystallized from a mixture of methanol and water. It had a M. P. of 72.5–74° C. and the hydrochloride, a M. P. of 176–178° C. A solution of 1.4 grams of this hydrochloride in 100 cc. of methanol was debenzylated by shaking with hydrogen in the presence of 1.5 grams of 3.5% palladium on charcoal until one mol of hydrogen had been absorbed. After filtration and evaporation of the solvent in vacuo, the residue was crystallized from a mixture of ethanol and ether. The dimethylcarbamate of N-[(2-hydroxy - 5 - phenyl)-benzyl]-methylamine hydrochloride thus obtained has a M. P. of 172–174° C.

EXAMPLE 5

*Dimethyl carbamate of 1-methylaminomethyl-2-naphthol hydrochloride*

A solution of 5 grams of 1-benzylmethylaminomethyl-2-naphthol and 5 cc. of dimethylcarbamyl chloride in 20 cc. of pyridine was heated for three hours on a steam bath. It was then poured into water and the mixture made alkaline with sodium hydroxide. The aqueous solution was extracted with ether and the ether layer was then washed with water and dried over sodium sulfate. After removal of the solvent by distillation in vacuo, the residue was dissolved in anhydrous ether and gaseous hydrogen chloride bubbled through. The dimethylcarbamate of 1-benzylmethylaminomethyl-2-naphthol hydrochloride formed and was recrystallized from a mixture of ethanol and ether. M. P. 199–201° C. A solution of 1.3 grams of this ester in 100 cc. of ethanol containing 1 gram of 3.5 palladium in charcoal was shaken with hydrogen until slightly more than one mol of hydrogen had been adsorbed. After removal of the catalyst by filtration, the filtrate was dried in vacuo. The residue crystallized and was recrystallized from a mixture of methanol and ether. The dimethyl carbamate of 1-methylaminomethyl-2-naphthol hydrochloride thus obtained melted at 111–113° C.

EXAMPLE 6

*Dimethyl carbamate of dl-(3-hydroxy-α-methylbenzyl) methylamine hydrochloride*

A solution of 50 grams of m-hydroxyacetophenone and 50 cc. of dimethylcarbamylchloride in 75 cc. of pyridine were heated on a steam bath for three hours. The mixture was poured into water, made alkaline with sodium hydroxide, and extracted with ether. The ether solution was washed with dilute HCl, dried and the ether boiled off. On distillation of the residue, the dimethylcarbamate of m-hydroxyacetophenone, boiling at 175–178° at 6 mm. pressure, was obtained.

A solution of 19 grams of the dimethylcarbamate of m-hydroxyacetophenone in 100 cc. of methanol containing 30 grams of methylamine was hydrogenated at 50° C. using Raney nickel as catalyst. The solvent was then boiled off and the residue dissolved in ether. The ether solution was extracted with dilute HCl, the acid layer then made alkaline with sodium hydroxide, and extracted with ether, the ether dried and then evaporated. Alcoholic HCl was added to the residue to give the dimethylcarbamate of dl-(3-hydroxy - α - methylbenzyl) methylamine hydrochloride. This was recrystallized from a mixture of isopropanol and ether. M. P. 129–132° C.

In the above description and the claims appended hereto, the term "di-substituted" is intended to refer to the R' and R'' substituents on the N atom in the carbamyl radical of Formula I. By the term "a radical convertible into an amino group," we mean such a radical as a benzyl urethane, a benzylamino, nitrile, nitro, oximino radical, which on hydrogenation forms a primary aminoalkyl or monoalkylaminoalkyl radical; or an aldehyde, acyl or similar radical which on hydrogenation in the presence of an amine forms a primary aminoalkyl or monoalkylaminoalkyl radical; or a halogen-alkyl radical, which on treatment with ammonia or a primary amine under mild conditions, forms a primary aminoalkyl or monoalkylaminoalkyl radical.

We claim:

1. A compound of the group consisting of dimethyl carbamic acid esters of phenolic primary alkylamines and phenolic secondary alkylamines, and the salts thereof.

2. A dimethyl carbamic acid ester of a phenolic primary alklamine and the salts thereof.

3. A dimethyl carbamic acid ester of hydroxyphenyl primary and secondary alklamines and the salts thereof.

4. A dimethyl carbamic acid ester of a nontertiary hydroxy-benzylamine and the salts thereof.

5. The diemthyl carbamic acid ester of o-hydroxy-benzylamine and the salts thereof.

6. The dimethyl carbamic acid ester of p-hydroxyphenylethylamine and the salts thereof.

7. The dimethyl carbamic acid ester of 1-methylaminomethyl-2-naphthol and the salts thereof.

8. The process which comprises reacting a primary aminoalkylphenol with a carbobenzoxy halide to form the corresponding N-carbobenzoxy aminoalkylphenol, reacting the latter with a dimethyl carbamyl halide to form the corresponding dimethyl carbamic acid ester of the N-carbobenzoxy aminoalkylphenol and hydrogenating the latter to split off the carbobenzoxy group and form the dimethyl carbamic acid ester of the primary aminoalkyl phenol.

9. A process which comprises hydrogenating a dimethyl carbamic acid ester of an N-carbobenzoxy aminoalkylphenol to split off the carbobenzoxy group and form the dimethyl carbamic acid ester of the corresponding primary aminoalkylphenol.

10. The process which comprises hydrogenating the dimethyl carbamyl ester of p-hydroxyphenyl-(N-carbobenzoxy)-ethylamine to form the dimethyl carbamic acid ester of p-hydroxyphenylethylamine.

11. The process which comprises hydrogenating a salt of the dimethyl carbamate of 1-benzylmethylaminomethyl-2-naphthol hydrochloride to form the dimethyl carbamate of 1-methylaminomethyl-2-naphthol hydrochloride.

12. The process which comprises hydrogenating the dimethyl carbamyl ester of N-carbobenzoxy salicylamine to form the dimethyl carbamic acid ester of o-hydroxy-benzylamine.

13. The method which comprises reacting a phenol having a radical convertible into an aminoalkyl radical of the group consisting of primary and secondary aminoalkyl radicals, said convertible radical being selected from the group consisting of N-carbobenzoxyaminoalkyl, dibenzylaminoalkyl, alkylbenzylaminoalkyl, and nitrile radicals, with a dimethyl carbamyl halide to form the corresponding disubstituted carbamic acid ester of the phenol, and converting the said radical by hydrogenation into the said aminoalkyl radical.

JOHN A. AESCHLIMANN.
ARTHUR STEMPEL.

No references cited.

Certificate of Correction

Patent No. 2,493,710

January 3, 1950

JOHN A. AESCHLIMANN ET AL.

It is hereby certified that errors appear in the printed specification of the above numbered patent requiring correction as follows:

Column 1, line 21, after the word and comma "example," insert $CH_3HNCH_2-$, or *alkyl-NH-CH(alkyl)-, as for example,*; column 6, line 28, for "3.5" read *3.5%*; column 7, line 13, for "alklamine" read *alkylamine*; line 15, for "alklamines" read *alkylamines*;

and that the said Letters Patent should be read with these corrections therein that the same may conform to the record of the case in the Patent Office.

Signed and sealed this 25th day of April, A. D. 1950.

[SEAL]

THOMAS F. MURPHY,
*Assistant Commissioner of Patents.*